(12) United States Patent
Tsai

(10) Patent No.: US 7,817,359 B2
(45) Date of Patent: Oct. 19, 2010

(54) LENS MODULE AND CAMERA MODULE UTILIZING THE SAME

(75) Inventor: Ming-Chiang Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 179 days.

(21) Appl. No.: 12/202,531

(22) Filed: Sep. 2, 2008

(65) Prior Publication Data

US 2009/0185284 A1 Jul. 23, 2009

(30) Foreign Application Priority Data

Oct. 11, 2007 (CN) .................... 2007 1 0202008

(51) Int. Cl.
*G02B 7/02* (2006.01)
(52) U.S. Cl. .................. 359/822; 359/811; 359/823
(58) Field of Classification Search ................ 359/822
See application file for complete search history.

(56) References Cited

U.S. PATENT DOCUMENTS

| 5,523,815 | A  | * | 6/1996  | Tamura      | 396/508 |
|-----------|----|---|---------|-------------|---------|
| 5,790,326 | A  | * | 8/1998  | Eckel et al.| 359/823 |
| 6,750,947 | B1 | * | 6/2004  | Tomita et al.| 355/52 |
| 7,113,351 | B2 | * | 9/2006  | Hovanky     | 359/824 |
| 2003/0011755 | A1 | * | 1/2003 | Omura et al.| 355/67 |
| 2005/0280903 | A1 |   | 12/2005 | Oshima et al.| |
| 2006/0250699 | A1 | * | 11/2006 | Silver     | 359/676 |
| 2006/0279849 | A1 | * | 12/2006 | Takei      | 359/666 |

FOREIGN PATENT DOCUMENTS

| CN | 1790149 A | | 6/2006 |
| JP | 55052009 A | * | 4/1980 |
| JP | 10-85978 A | | 4/1998 |
| JP | 2001134967 A | * | 5/2001 |

OTHER PUBLICATIONS

Machine Translation JP2001134967.*

\* cited by examiner

*Primary Examiner*—Jessica T Stultz
(74) *Attorney, Agent, or Firm*—Andrew C. Cheng

(57) ABSTRACT

A lens module includes a barrel defining a first through hole, two or more lenses received in the first through hole of the barrel including at least one movable lens, and at least one driving device moving the movable lens. The driving device includes a fixed portion, a movable portion, hydraulic fluid, and an adjustment pole. The fixed portion is secured on the inner surface of the barrel and defines a trough with an opening facing along the axis of the lens module. The movable portion has a first end and an opposite second end, the first end inserted into the trough and sealing the space between the first end and the bottom wall of the trough, and the second end secured to a movable lens. The hydraulic fluid fills the space. The adjustment pole is inserted into the trough from a second through hole running through the barrel and a wall of the trough adjacent to the barrel, and is movable in the second through hole.

18 Claims, 4 Drawing Sheets

LENS MODULE AND CAMERA MODULE UTILIZING THE SAME

BACKGROUND

1. Field of the Invention

The present invention relates to the field of photography, and particularly to a lens module and a camera module utilizing a hydraulic zoom drive.

2. Description of the Related Art

In recent years, mobile terminals, such as mobile phones and personal digital assistants (PDAs), with camera functions have become popular and commonly used. Such mobile terminal cameras generally comprise a lens affixed to an image capture component such as a charge coupled device (CCD), complementary metal oxide semiconductor (CMOS), and the like, and are configured to capture an image of an object through the lens and to allow digital registration of the image.

In order to improve quality and versatility of image capture by mobile terminals, zoom lens systems are used. Accordingly, numerous driving components, such as a motor, gears and others, are assembled in the mobile terminal, which consumes space and affects reduction in size of mobile terminals.

What is needed, therefore, is a lens module and a camera module with simplified structure to overcome the described limitations.

BRIEF DESCRIPTION OF THE DRAWINGS

Many aspects of the present lens module and camera module can be better understood with reference to the following drawings. The components in the drawings are not necessarily drawn to scale, the emphasis instead being placed upon clearly illustrating the principles of the present lens module and camera module.

DETAILED DESCRIPTION OF EMBODIMENTS

Embodiments will now be described in detail, with reference to the drawings.

Figure 1:
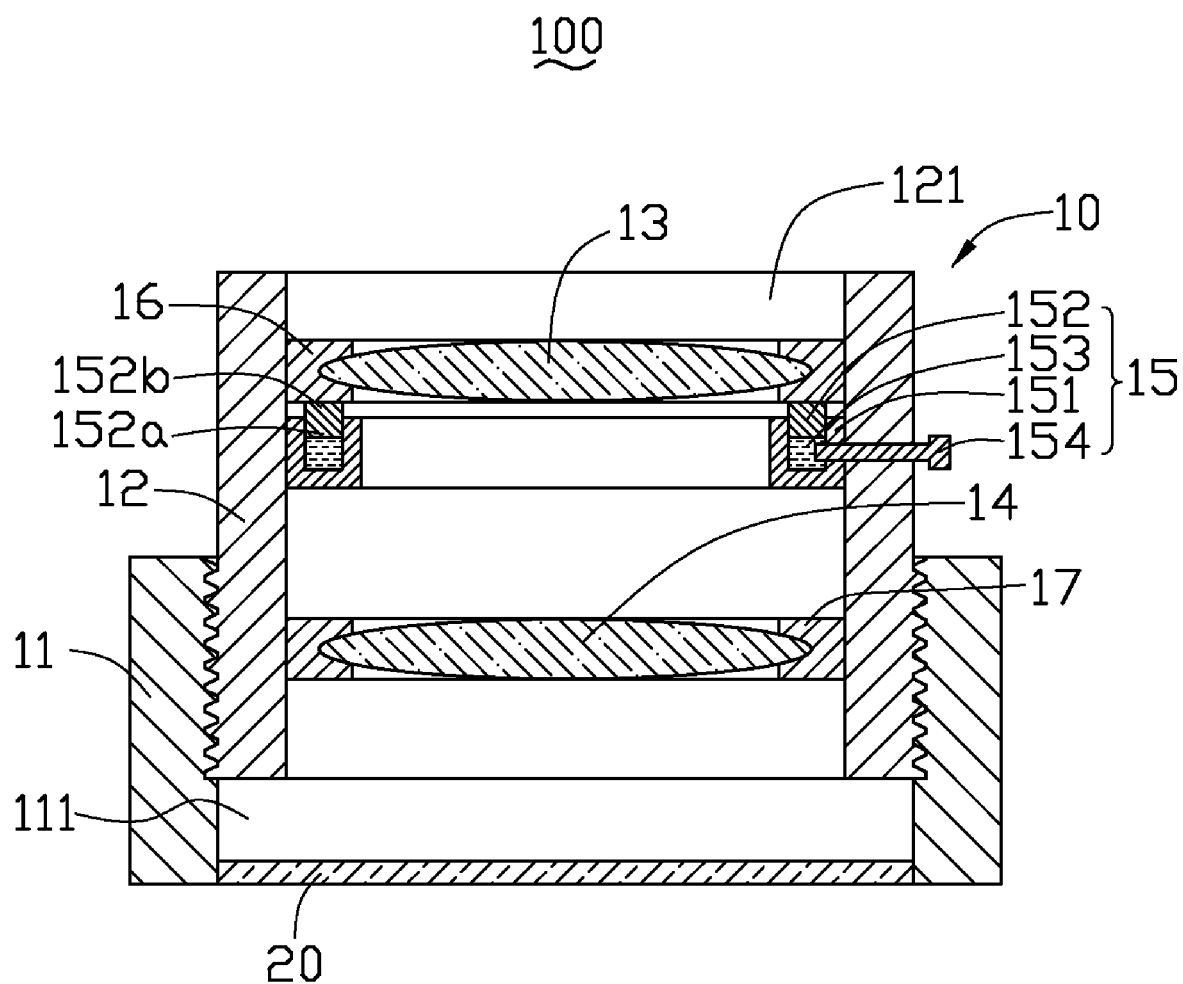
FIG. 1 is a cross-section of a camera module according to a first embodiment.
Figure 2:
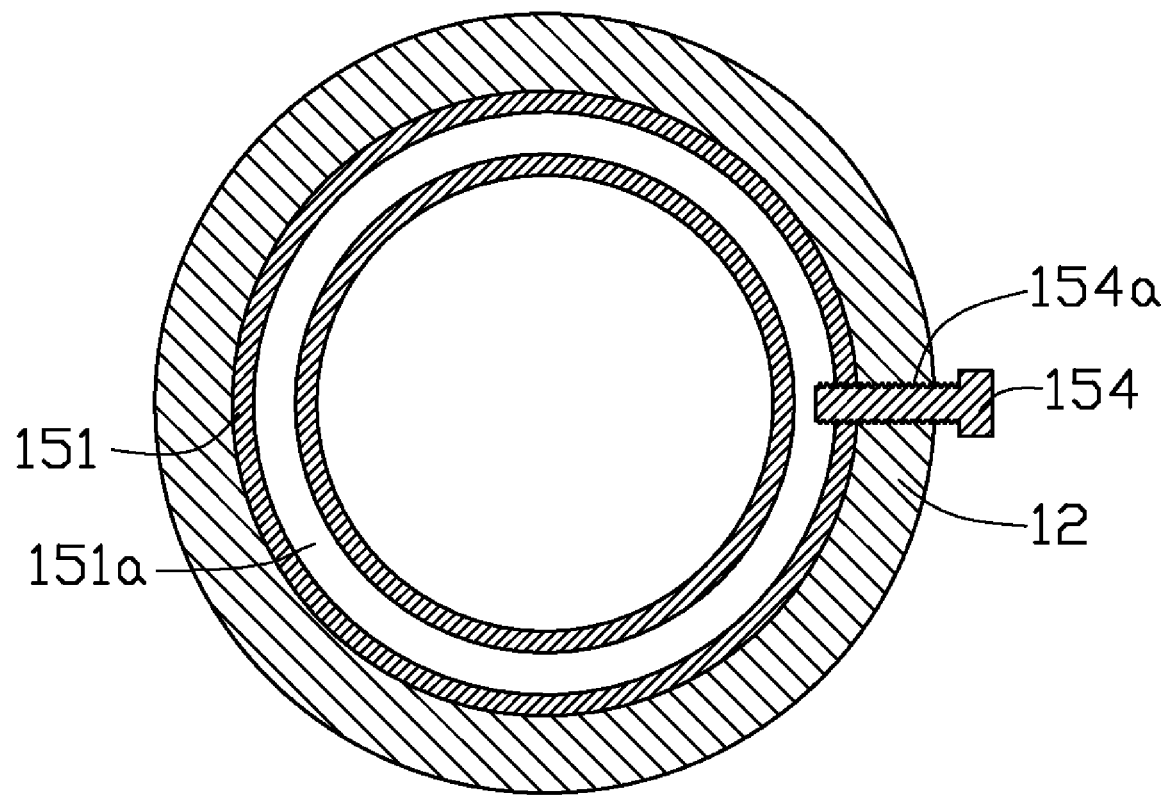
FIG. 2 is a schematic view of a hydraulic drive of the camera module of FIG. 1.

Referring to FIG. 1 and FIG. 2, a camera module 100 according to a first embodiment includes a lens module 10 and an image sensor 20 disposed at the image side of the lens module 10.

In the present embodiment, the lens module 10 includes a holder 11, a barrel 12, a movable lens 13, movable relative to the barrel 12, a stationary lens 14, stationary relative to the barrel 12, and a hydraulic drive 15.

The holder 11 defines a through hole 111 with one end receiving the image sensor 20 and the other end coupled to the barrel 12. The holder 11 engages the barrel 12 by cam or thread interface. In the present embodiment, the holder 11 engages the barrel 12 via a threaded interface.

The barrel 12 defines a through hole 121. In the present embodiment, the movable lens 13, the hydraulic drive 15, and the stationary lens 14 are received in the through hole 121, in that order, from the object side to the image side of the camera module 100. The movable lens 13 is surrounded by a lens frame 16, slidable relative to the barrel 12 and connected to the hydraulic drive 15 by glue or other means. The stationary lens 14 is surrounded by a lens frame 17, fixed to the inner surface of the barrel 12 by glue or other means. Using the lens frame 16 and 17, the movable lens 13 and the stationary lens 14 can be easily fixed to the driving device 15 and the barrel 12 respectively without requiring adhesive application.

The driving device 15 includes a fixed portion 151, a movable portion 152, hydraulic fluid 153, and an adjustment pole 154.

The fixed portion 151 is secured on the inner surface of the barrel 12, and defines a trough 151a with an opening facing the movable lens 13. The movable portion 152 has a first end 152a and an opposite second end 152b. The first end is inserted into the trough 151a and seals the space between the first end and the bottom wall of the trough 151a. The second end is secured to the lens frame 16. The hydraulic fluid 153 fills the space formed between the movable portion 152 and the fixed portion 151. The hydraulic fluid 153 can be water, oil, or other. In the present embodiment, the fixed portion 151, the trough 151a, and the movable portion 152 are annular, and the hydraulic fluid 153 is water. In order to prevent the hydraulic fluid 153 from leaking out of the trough 151a from the opening thereof, a lubricant can be coated on the side surface of the first end of the movable portion 152 to fill gaps between the side surface of the first end of the movable portion 152 and sidewalls of the trough 151a.

The adjustment pole 154 can enter the trough 151a from a through hole 154a which runs through the barrel 12 and a sidewall of the trough 151a adjacent to the barrel 12. In the present embodiment, the through hole 154a is a screw hole, and the outer surface of the adjustment pole 154 is threaded to engage the through hole 154a. In order to prevent the hydraulic fluid 153 from leaking out of the trough 151a from the through hole 154a, a lubricant can be coated on the side surface of the adjustment pole 154.

The focus of the lens module 10 can be changed by manually rotating the adjustment pole 154 into/out of the trough 151a to change the distance between the movable lens 13 and the stationary lens 14. When the adjustment pole 154 rotates in the trough 151a, the hydraulic fluid 153 moves the movable portion 152 away from the fixed portion 151 together with the movable lens 13, such that the distance between the movable lens 13 and the stationary lens 14 increases. Conversely, when the adjustment pole 154 is rotated out of the trough 151a, the atmospheric pressure moves the movable portion 152 toward the fixed portion 151 together with the movable lens 13, and the distance between the movable lens 13 and the stationary lens 14 thus decreases.

Figure 3:
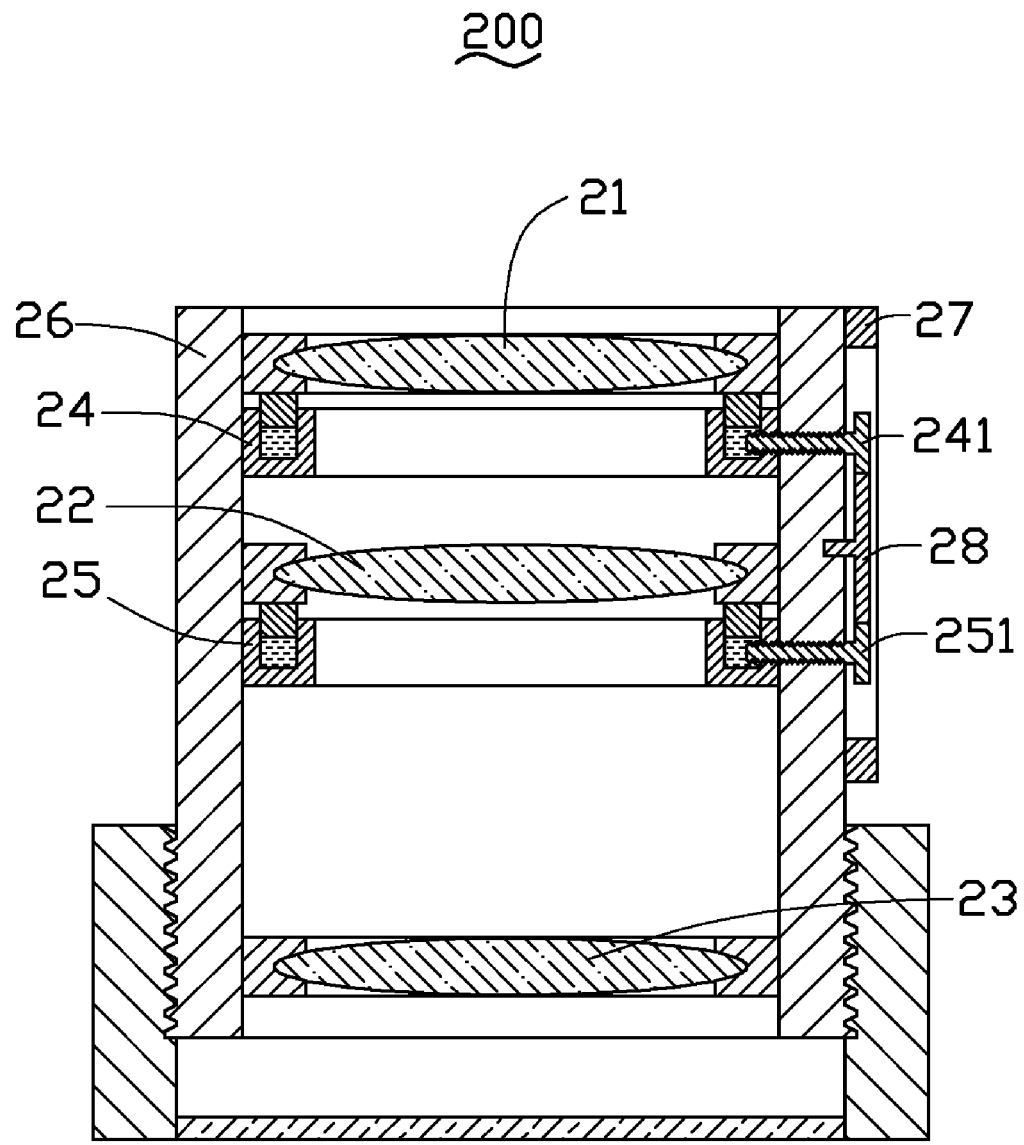
FIG. 3 is a cross-section of a camera module according to a second embodiment.
Figure 4:
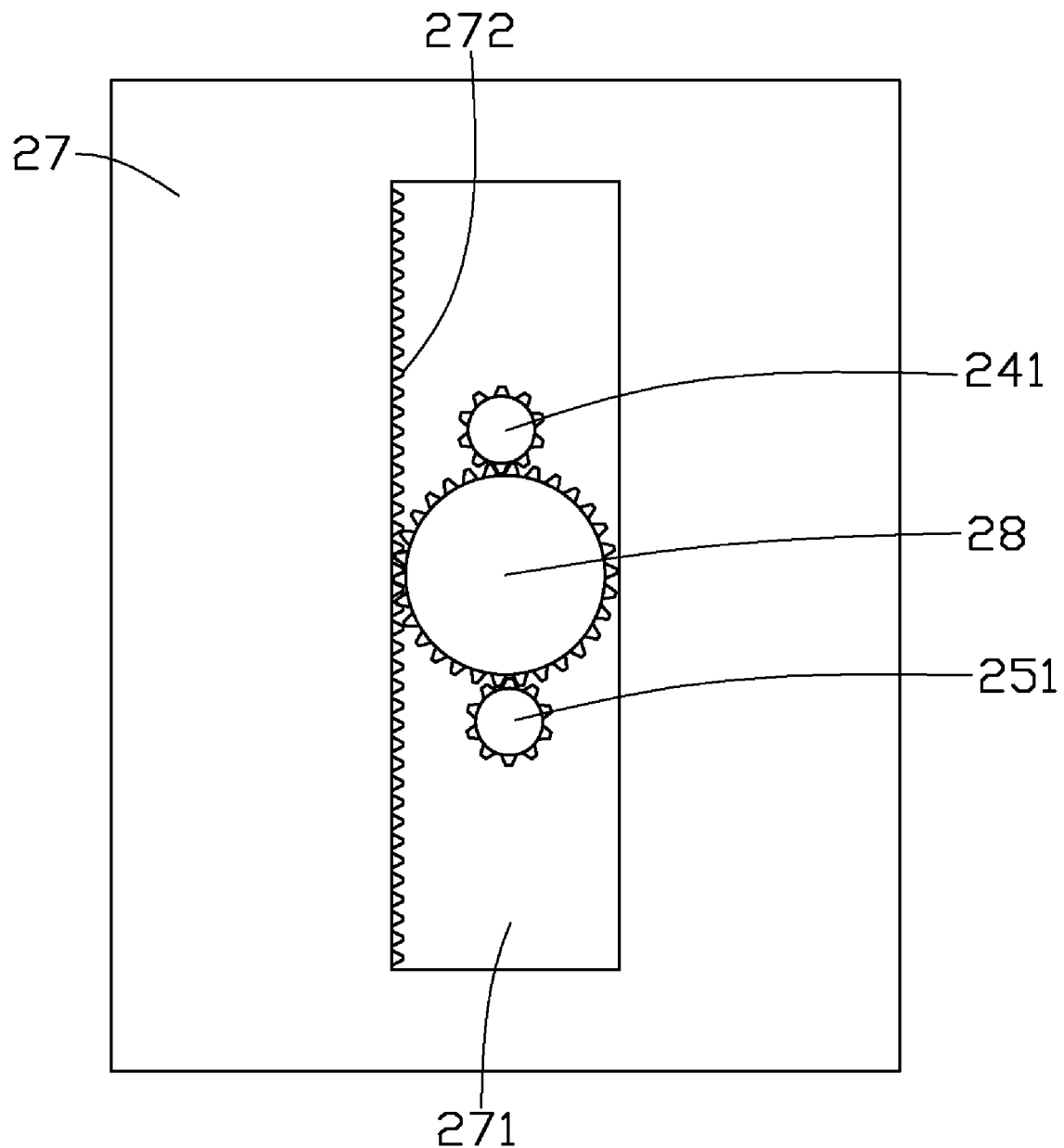
FIG. 4 is a schematic view of a focus adjusting mechanism of the camera module of FIG. 3.

FIG. 3 and FIG. 4 show a camera module 200 according to a second embodiment, differing from camera module 100 of the first embodiment only in that camera module 200 has more lenses and hydraulic drives. The camera module 200 has a barrel 26, and a first movable lens 21, a second movable lens 22, and a stationary lens 23 received in the barrel 26, in that order, from the object side to the image side of the camera module 200. The camera module 200 also has a first hydraulic drive 24 driving the first movable lens 21, and a second hydraulic drive 25 driving the second movable lens 22.

The driving device 24 has a first adjustment pole 241, and the driving device 25 has a second adjustment pole 251. Focus of the camera module 200 is adjustable by rotation of the first adjustment pole 241 and/or the second adjustment pole 251. In the present embodiment, rotation of the two adjustment poles 241 and 251 together to change the focus of the camera module 200 is achieved by both adjustment poles 241 and 251 having toothed ends protruding out of the barrel 26. The camera module 200 also has a focus adjusting mechanism including a slide button 27 and a gear 28. The gear 28 is disposed between the adjustment pole 241 and 251 and engages the teeth of the adjustment poles 241 and 251. The gear 28 is rotatable relative to the barrel 26, and the adjustment poles 241 and 251 rotate with the gear 28. Slide button 27 on the outer surface of the barrel 26 receives the gear 28 and the outer ends of the adjustment poles 241 and 251 in a center hole 271 thereof. The center hole 271 has a straight toothed edge 272 extending along the axis of the barrel 26 to engage the gear 28. By sliding the slide button 27, the gear 28 is rotated. Accordingly, rotation of adjustment poles 241 and 251 changes the focus of the camera module 200.

The camera module of the embodiments uses a hydraulic drive to move the movable lens thereof to adjust focus of the camera module, without requiring many components such as motors, gears, or others. The hydraulic drive has a relatively simple structure and, being received in the barrel, accordingly, allows reduced size for the camera module.

While certain embodiments have been described and exemplified, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens module comprising:
   a barrel defining a first through hole;
   two or more lenses received in the first through hole of the barrel including at least one movable lens; and
   at least one driving device moving the movable lens, the driving device comprising
      a fixed portion secured on the inner surface of the barrel and defining a trough with an opening facing the at least one movable lens;
      a movable portion with a first end and an opposite second end, the first end inserted into the trough and sealing a space between the first end and the bottom wall of the trough, and the second end secured to the at least one movable lens;
      a hydraulic fluid filling the space; and
   an adjustment pole inserted into the trough and threadedly engaged in a second through hole running through the barrel and a wall of the trough adjacent to the barrel, the adjustment pole being movable inwardly or outwardly in the second through hole by manual rotation thereof.

2. The lens module as claimed in claim 1, wherein the two or more lenses include at least one stationary lens, surrounded by a lens frame fixed to the inner surface of the barrel.

3. The lens module as claimed in claim 1, wherein the movable lens is surrounded by a lens frame fixed to the second end of the movable portion.

4. The lens module as claimed in claim 1, wherein the hydraulic fluid is water or oil.

5. The lens module as claimed in claim 1, wherein the fixed portion, the trough, and the movable portion are annular.

6. The lens module as claimed in claim 1, wherein the second through hole is a screw hole, and the outer surface of the adjustment pole is threaded to engage the second trough hole.

7. The lens module as claimed in claim 1, wherein the lens module comprises two movable lenses moved by two driving devices respectively, with the two driving devices comprising two adjustment poles having toothed ends protruding out of the barrel, the lens module further comprising:
   a gear disposed between the two adjustment poles and engaging the toothed ends thereof; and
   a slide button disposed on the outer surface of the barrel and having a center hole receiving the gear and the outer end of the two adjustment poles, the center hole having a straight toothed edge extending along the axis of the barrel to engage the gear, the straight toothed edge configured to drive the gear to rotate, thereby the two adjustment poles are simultaneously driven to rotate by the rotation of the gear.

8. The lens module as claimed in claim 2, wherein the lens frame is fixed to the inner surface of the barrel by glue.

9. A camera module comprising a lens module and an image sensor disposed at the image side of the lens module, wherein the lens module comprises:
   a barrel defining a through hole;
   two or more lenses received in the first through hole of the barrel including at least one movable lens; and
   at least one driving device for moving the movable lens, the driving device comprising,
      a fixed portion secured on the inner surface of the barrel and defining a trough with an opening facing the at least one movable lens;
      a movable portion with a first end and an opposite second end, the first end inserted into the trough and sealing a space between the first end and the bottom wall of the trough, the second end secured to the at least one movable lens;
      a hydraulic fluid filling the space; and
   an adjustment pole inserted into the trough and threadedly engaged in a second through hole running through the barrel and a wall of the trough adjacent to the barrel, the adjustment pole being movable inwardly or outwardly in the second through hole by manual rotation thereof.

10. The camera module as claimed in claim 9, wherein the two or more lenses comprise at least one stationary lens, surrounded by a lens frame fixed to the inner surface of the barrel.

11. The camera module as claimed in claim 9, wherein the movable lens is surrounded by a lens frame fixed to the second end of the movable portion.

12. The camera module as claimed in claim 9, wherein the hydraulic fluid is water or oil.

13. The camera module as claimed in claim 9, wherein the fixed portion, the trough, and the movable portion are annular.

14. The camera module as claimed in claim 9, wherein the second through hole is a screw hole, and the outer surface of the adjustment pole is threaded to engage the second trough hole.

15. The camera module as claimed in claim 9, wherein the lens module comprises two movable lenses moved by two driving devices respectively, the two driving devices comprising the two driving devices comprising two adjustment poles having toothed ends protruding out of the barrel, the lens module further comprising:
   a gear disposed between the two adjustment poles and engaging the toothed ends thereof; and
   a slide button disposed on the outer surface of the barrel and having a center hole receiving the gear and the outer end of the two adjustment poles, the center hole having a straight toothed edge extending along the axis of the barrel to engage the gear, the straight toothed edge configured to drive the gear to rotate, thereby the two adjustment poles are simultaneously driven to rotate by the rotation of the gear.

16. The camera module as claimed in claim 10, wherein the lens frame is fixed to the inner surface of the barrel by glue.

17. A lens module comprising:
   a barrel defining a first through hole;

two or more lenses received in the first through hole of the barrel including at least one movable lens; and at least one driving device configured for moving the movable lens, the driving device comprising a fixed portion secured on the inner surface of the barrel and defining a trough having an opening facing the at least one movable lens, the fixed portion and the barrel cooperatively defining a second through hole running through a sidewall of the barrel and a sidewall of the trough adjacent to the barrel;

a movable portion with a first end and an opposite second end, the first end inserted into the trough and sealing a space between the first end and the bottom wall of the trough, and the second end secured to the at least one movable lens;

a hydraulic fluid filling the space; and an adjustment pole extending through the second through hole and inserted into the trough, the adjustment pole being movable toward or away from the trough by manual rotation thereof, the hydraulic fluid configured for moving the movable portion together with the movable lens along the axis of the lens module with the movement of the adjustment pole in the second through hole.

18. The lens module as claimed in claim 17, wherein the lens module comprises two movable lenses moved by two driving devices respectively, with the two driving devices comprising two adjustment poles having toothed ends protruding out of the barrel, the lens module further comprising:

a gear disposed between the two adjustment poles and engaging the toothed ends thereof; and a slide button disposed on the outer surface of the barrel and having a center hole receiving the gear and the outer end of the two adjustment poles, the center hole having a straight toothed edge extending along the axis of the barrel to engage the gear, the straight toothed edge configured to drive the gear to rotate, thereby the two adjustment poles are simultaneously driven to rotate by the rotation of the gear.

* * * * *